United States Patent Office

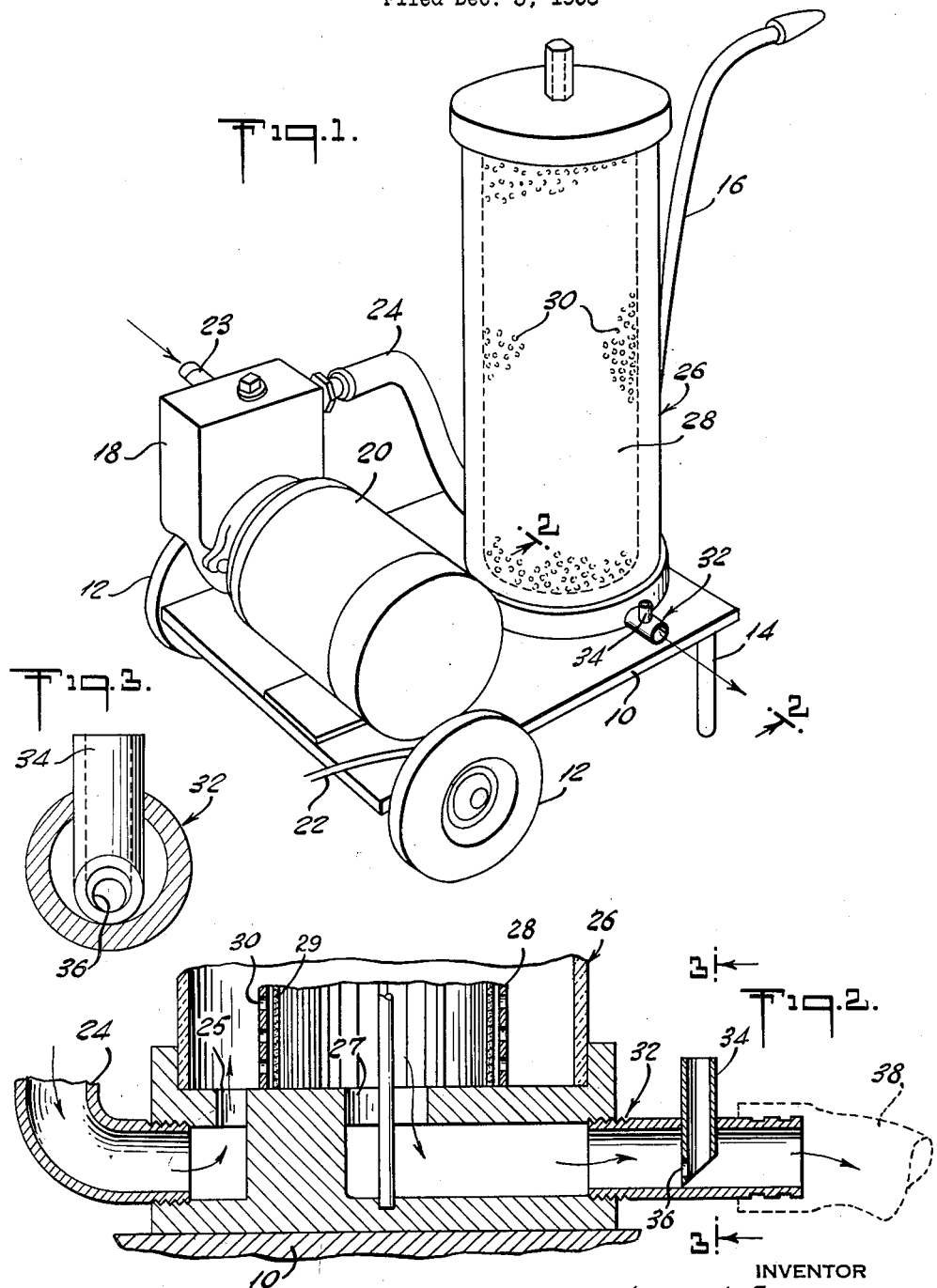

3,012,676
Patented Dec. 12, 1961

3,012,676
LIQUID PURIFIER
Julius L. Englesberg, 123 Knollwood Road,
Rockville Center, N.Y.
Filed Dec. 3, 1958, Ser. No. 777,984
3 Claims. (Cl. 210—94)

This invention relates in general to filtering devices and particularly to a new and useful portable filter and water aerator having a self-contained pump and driving motor mounted on a hand wheeled truck and including simple hose connections for continuously withdrawing water from swimming pools or the like, filtering and aerating the water, and returning it to the pool.

With the increased constructions of swimming pools, there has arisen a need for a simple, preferably portable, device which may be periodically connected to the water of the swimming pool to filter it and freshen it. Most devices of this type which are presently available include large stationary filtering units and fixed pump and motor combination recirculators. In many instances there is no indication that filtration is being accomplished and the operator fails to know when filtration has been carried out to a satisfactory extent.

In accordance with the present invention there is provided an inexpensive simply constructed portable filtering and aerating unit including a filter container having a transparent wall to indicate the filtering action visibly, and also including an aerator attachment for continuously drawing in and intermixing fresh air with the water after it has been filtered clean.

The complete assembly is mounted on a wheeled truck which permits easy maneuvering to a desired location adjacent a swimming pool or similar tank to be filtered and aerated. All of the parts are readily available for inspection, cleaning and repair. The filter container includes a removable cartridge which may be periodically cleaned or replaced.

Accordingly, it is an object of this invention to provide an inexpensive portable liquid filtering and aerating device.

A further object of this invention is to provide a liquid filtering and aerating device particularly adapted for swimming pool use, including an electrically driven pump and a filtering and aerating device mounted on a single wheeled platform, and including handle means for maneuvering the equipment to a place of use.

A further object of this invention is to provide a liquid filtering device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a perspective view of a portable liquid filtering and aerating device constructed in accordance with the invention;

FIG. 2 is a fragmentary vertical section taken on the line 2—2 of FIG. 1; and

FIG. 3 is a vertical section taken on the line 3—3 of FIG. 2.

Referring to the drawings in particular, the invention as embodied therein includes a mounting platform 10 having suitable axle bearings near one end for supporting a pair of wheels 12, 12, the opposite end of the platform rests on downwardly extending corner posts 14 (one of which is shown). The platform 10 may be maneuvered on its wheels 12 by grasping an upwardly extending handle 16 to guide the apparatus into a location for use.

In accordance with the invention, a circulating pump 18 and an electric driving motor 20 are mounted on the platform 10 over the axles of the wheels 12. The motor 20 may be connected to any suitable source of electrical power through an extension cord 22. The pump 18 is provided with an inlet tube 23 to which is connected a hose which leads from the tank having water requiring filtration and purifying. The electric motor 20 continuously drives the pump 18 to draw water in at the inlet tube 23 and circulate it through a discharge tube 24 through an inlet arcuate opening 25 on one side of a filtering element generally designated 26. The filtering element 26 is cylindrical and contains a hollow cylindrical filtering cartridge 28 in the center thereof spaced from the exterior walls of the element 26. Water circulated through the discharge tube 24 enters between the walls of the filtering element 26 and filtering cartridge 28. An inner wall of the cartridge 28, shown by the hatched section 29 of FIG. 2, is made of specially curved, pleated and highly impregnated resin paper and is provided with a multiplicity of perforations small enough to prevent dirt particles down to five microns in size from passing therethrough. The outer wall has large size openings 30 to trap large objects such as leaves, sticks, hairs, etc. The dirt particles trapped are visible through the transparent wall of the filtering element 26. Liquid is circulated upwardly within the cartridge 28 and through perforations 30 and out through a central opening 27 at the bottom interior of the cartridge and through a discharge connection generally designated 32.

In accordance with the invention the discharge connection 32 is provided with a tap hole on the top side thereof which receives a tube 34. The tube 34 has its lower end in contact with the bottom wall of the discharge connection 32 and this end is cut off at an angle so that the downstream wall of the tube 34 is shorter than the upstream wall. The tube 34 is also provided with a circular opening 36 at the upstream side. Liquid which flows through the perforations 30 to the space inside the cartridge wall and through opening 27 and into the discharge connection 32, flows through and around the opening 36 of the aerating tube 34. The tube 34 forms a simple venturi-like section in the discharge connection 32 and causes an area of reduced pressure at the location of the hole 36 to effect the continuous drawing in of air from the atmosphere through the tube 34. This air mixes with the water as it is passed through the discharge connection 32 and effects its sweetening and purifying by aeration. Water exiting from the discharge connection 32 is then passed back to the swimming pool through a tube 38 (indicated in phantom in FIG. 2).

The portable water purifier is preferably made of non-corrosive parts to permit its use outdoors. The walls of the filtering element 26 are preferably made of a transparent material in order to make the filtering action visible to the operator. The unit may be designed for pumping in excess of 1200 gallons per hour and requires no installation. In order to operate the device it is simply necessary to insert the inlet and discharge connections in the swimming pool at remote locations and plug the electric cord into a suitable source of electrical energy for starting the pump. The device fully purifies the water effecting sweeter, more pleasurable water for swimming.

While a specific embodiment of the invention has been shown and described in detail to illustrate the application of the invention principles, it will be understood that the invention may be embodied otherwise without departing from such principles.

I claim:
1. A transportable water filtering and purifying device comprising a wheeled platform, an electric pump and motor mounted on said platform, a conduit connecting said pump to the water to be filtered, a cylindrical filter element mounted vertically on said platform, said filter comprising an outer transparent wall and an inner cartridge, an inlet positioned at the bottom of one side of said filter and connected from said pump to the portion of said filter between said wall and cartridge, a return outlet conduit positioned at the bottom of the other side of said filter and connected from said inner cartridge to said water to be filtered, and a tubular aerating conduit extending vertically into an opening in the top of said outlet and across the path of water flowing therethrough, the inner end of said aerating conduit being in contact with the bottom wall of said outlet, said aerating conduit having a circular opening in the upstream tubular wall permitting passage of a portion of said water therethrough and said inner end being cut off at an angle so that the downstream wall is shorter than said upstream wall to complete the passage of said portion of water, whereby said water flowing in said outlet and aerating conduit induces air into said aerating conduit to mix with said water.

2. The device of claim 1, wherein said platform comprises bearing means at one end, a pair of wheels rotatably mounted in said bearing means and supporting said platform at said end, a post supporting said platform at the opposite end, and a handle connected to said platform and extending upwardly therefrom at said post end of said platform for maneuvering said platform, said electric pump and motor being mounted on said platform adjacent said wheels.

3. The device of claim 1 wherein said filter cartridge comprises an outer coarse filter and an inner fine filter.

References Cited in the file of this patent

UNITED STATES PATENTS

| | | |
|---|---|---|
| 205,793 | Gable | July 9, 1878 |
| 229,744 | Otis | July 6, 1880 |
| 771,469 | Fritsche | Oct. 4, 1904 |
| 1,463,496 | Bridgers | July 31, 1923 |
| 1,652,423 | Belke | Dec. 13, 1927 |
| 1,662,101 | Bossi | Mar. 13, 1928 |
| 1,708,146 | Meyer | Apr. 9, 1929 |
| 1,937,860 | Watkins | Dec. 5, 1933 |
| 2,255,296 | Moseley | Sept. 9, 1941 |
| 2,325,169 | Alsop | July 27, 1943 |
| 2,743,019 | Kovacs | Apr. 24, 1956 |

FOREIGN PATENTS

| | | |
|---|---|---|
| 7,426 | Great Britain | May 19, 1888 |
| 893,929 | Germany | Oct. 19, 1953 |